United States Patent
Delavaux

[11] Patent Number: 6,081,368
[45] Date of Patent: Jun. 27, 2000

[54] OPTICAL AMPLIFIER FOR BI-DIRECTIONAL WDM OPTICAL COMMUNICATIONS SYSTEMS

[75] Inventor: Jean-Marc Pierre Delavaux, Wescosville, Pa.

[73] Assignee: Lucent Technologies Inc., Murray Hill, N.J.

[21] Appl. No.: 08/997,262

[22] Filed: Dec. 23, 1997

[51] Int. Cl.$^7$ .................................................. H01S 3/00
[52] U.S. Cl. ........................................... 359/341; 359/114
[58] Field of Search ................................... 359/113, 114, 359/124, 333, 341

[56] References Cited

U.S. PATENT DOCUMENTS

| | | | |
|---|---|---|---|
| 5,633,741 | 5/1997 | Giles | 359/124 |
| 5,742,416 | 4/1998 | Mizrahi | 359/134 |
| 5,815,308 | 9/1998 | Kim et al. | 359/341 |
| 5,847,862 | 12/1998 | Chraplyvy et al. | 359/337 |

*Primary Examiner*—Mark Hellner

[57] ABSTRACT

In accordance with the invention, an amplifier for a bi-directional WDM optical system comprises an arrangement of multiplexers with unidirectional arms disposed between a pair of bi-directional amplification stages. The multiplexer arrangement combines and separates wavelengths in both directions and reduces the effects of Rayleigh backscattering and amplified spontaneous emission.

10 Claims, 3 Drawing Sheets

OPTICAL AMPLIFIER FOR BI-DIRECTIONAL WDM OPTICAL COMMUNICATIONS SYSTEMS

TECHNICAL FIELD

This invention relates to optical amplifiers and, in particular, to an optical amplifier especially useful for bi-directional wavelength division multiplexed optical communications systems.

BACKGROUND OF THE INVENTION

Optical communications systems employing optical fibers have reached a state of technical sophistication and increasing commercial importance. Such systems have greatly increased the capacity of present and contemplated telecommunications systems. Nonetheless there is a relentless demand for ever increasing capacity.

Wavelength division multiplexed systems (WDM systems) offer the prospect of greatly increased capacity, and bi-directional WDM systems offer more efficient use of optical fiber networks and higher transmission capacity than unidirectional systems.

Amplifiers are particularly important in bi-directional optical communications systems. In such systems, signal crosstalk due to Rayleigh backscattering can degrade transmission performance. And in some systems using rare earth doped amplifiers, amplified spontaneous emission (ASE) can degrade both upstream and downstream sensitivities. As a consequence, amplifier design has assumed increasing importance in bi-directional systems.

A variety of amplifier designs have been proposed for bi-directional optical communications systems. See, for example, J-M. Delavaux et al., "Repeated Bi-directional 10 Gb/s-240 km Fiber Transmission Experiment", *Optical Fiber Technology 2, IEEE Photon Tech. Lett.*, pp. 1256–59 (1996); Shien-Kuei Liaw et al., "Amplified Multichannel Bi-directional Transmission Using a WDM MUX/DMUX Pair for Narrowband Filtering", *Electronic Letters* (Victoria, B.C., July 1997); Ken-ichi Suzuki et al., "Bi-directional Ten-Channel 2.5 Gbit/s WDM Transmission . . . ", *OAA 97*, PD 12-1 ( ) and Chang-Hee Lee et al., "Bi-directional Transmission of 80 Gb/s . . . WDM Signal Over 100 km Dispersion", OECC 97 (Seoul Korea, 1997). While amplifier designs are well developed for single channel systems, designs for WDM systems continue to have a number of shortcomings. Accordingly there is a need for an improved amplifier for bi-directional WDM optical communications systems.

SUMMARY OF THE INVENTION

In accordance with the invention, an amplifier for a bi-directional WDM optical system comprises an arrangement of multiplexers with unidirectional arms disposed between a pair of bi-directional amplification stages. The multiplexer arrangement combines and separates wavelengths in both directions and reduces the effects of Rayleigh backscattering and amplified spontaneous emission.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
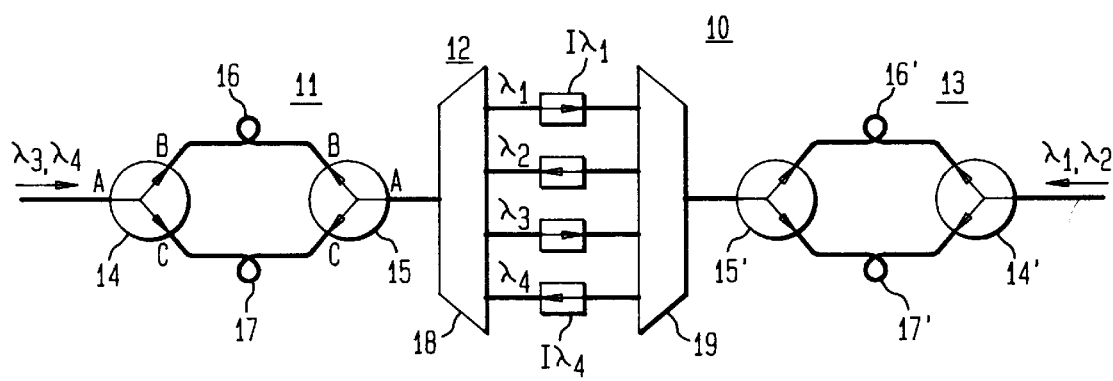
FIG. 1 is a schematic representation of an optical amplifier in accordance with the invention.

Referring to the drawings, FIG. 1 is a schematic representation of an optical amplifier 10 comprising a pair of amplifier sections 11, 13 with a multiplexer section 12 disposed between the amplifier sections.

Amplifier section 11 is a bi-directional amplifier preferably comprising a pair of optical circulators 14, 15 connected by a pair of fiber amplifiers 16, 17. Specifically each circulator can have three ports designated A, B, C. If we take port A of circulator 14 as the input port and port A of circulator 15 as the output port, then amplifying fiber 16, connecting port B of circulator 14 with port B of circulator 15 amplifies the signal propagating from left to right. Amplifying fiber 17 connecting ports C of circulators 14, 15 amplifies the signal right to left. Amplifier section 13 can be a bi-directional amplifier of similar structure with circulators 14', 15' and fiber amplifiers 16', 17'.

While bidirectional amplifiers employing circulators are preferred, both circulators can be replaced by two open-ended amplifying sections that would amplify the two sets of counter-propagating wavelengths. The disadvantage would be a noisier amplifier, more prone to lasing.

The multiplexer section 12 is an arrangement of multiplexers to separate and combine wavelengths traveling in each direction. It preferably comprises a pair of wavelength division multiplexers (WDMs) 18, 19. The WDMs are connected by unidirectional arms $\lambda_1, \lambda_2, \ldots \lambda_4$ containing isolators $I_{\lambda 1}, I_{\lambda 2}, \ldots, I_{\lambda 4}$ oriented in the direction of intended propagation (as indicated by the direction of the arrows).

Switchable or latchable isolators can be used instead of fixed isolators. This would permit all or some of the channels to propagate in the same direction. Thus the propagating wavelengths can be dynamically programmed, providing greater flexibility.

In operation, signal components, traveling from left to right e.g. $\lambda_3, \lambda_4$ enter amplifier section 11 at circulator 14, are amplified by fiber amplifier 16 and leave via circulator 15. At WDM 18 the components are separated onto unidirectional arms designated $\lambda_3, \lambda_4$ respectively, and recombined at WDM 19 for entry into the second amplifier section 13. By unidirectional arms is meant optical paths containing unidirectional components, here isolators, that permit light to pass in one direction but not the other. The recombined signal enters 13 via circulator 15', is amplified in fiber amplifiers 16' and exits via circulator 14'. Signal components, traveling from right to left e.g. $\lambda_1, \lambda_2$ follow similar paths through amplifier 17' in the reverse direction.

A first advantage of this device is that any amplified Rayleigh backscattered signal will be blocked by the isolators in the MUX section 12. The isolators, $I_{\lambda 1}, I_{\lambda 2}, \ldots, I_{\lambda 4}$ can be switchable isolators, in which case, one may choose which channels propagate in which direction.

Figure 2:
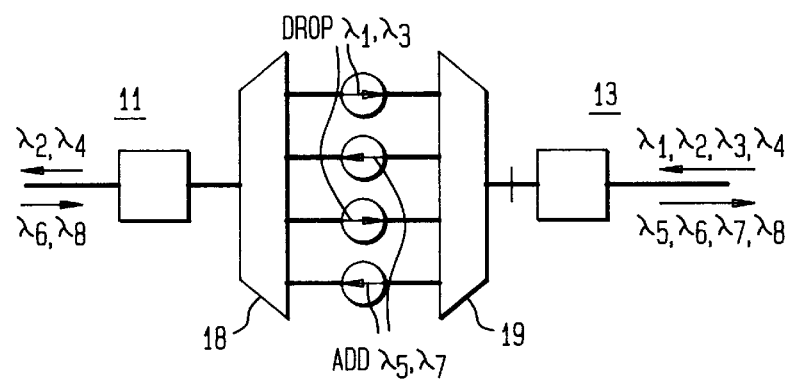
FIG. 2 is an alternative embodiment using circulators rather than isolators between the WDMs.

FIG. 2. Illustrates an alternative embodiment wherein multiport circulators $C_{\lambda 1}, C_{\lambda 2}, \ldots, C_{\lambda 4}$ are substituted for isolators $I_{\lambda 1}, I_{\lambda 2} \ldots$, respectively. The advantage of using circulators rather than isolators is that circulators provide points for adding and dropping channels. In the specific embodiment illustrated, upstream channels $\lambda_1, \lambda_2, \lambda_3, \lambda_4$ are separated by WDM 19. Here we use the wavelength periodicity of the free spectral range (FSR) of WDM routers, in particular the phaser type gratings, to permit addition and dropping of channels. $\lambda_2$ and $\lambda_4$ are transmitted through the circulators while $\lambda_1$ and $\lambda_3$ are dropped. In the downstream direction $\lambda_6$ and $\lambda_8$ are transmitted and $\lambda_5$ and $\lambda_7$ are added through their respective circulators $C_{\lambda 5}$, $C_{\lambda 7}$. If switchable circulators are used, then one may control which channels are added, dropped or transmitted, and all or some of the channels may be directed in one direction only.

Figure 3:
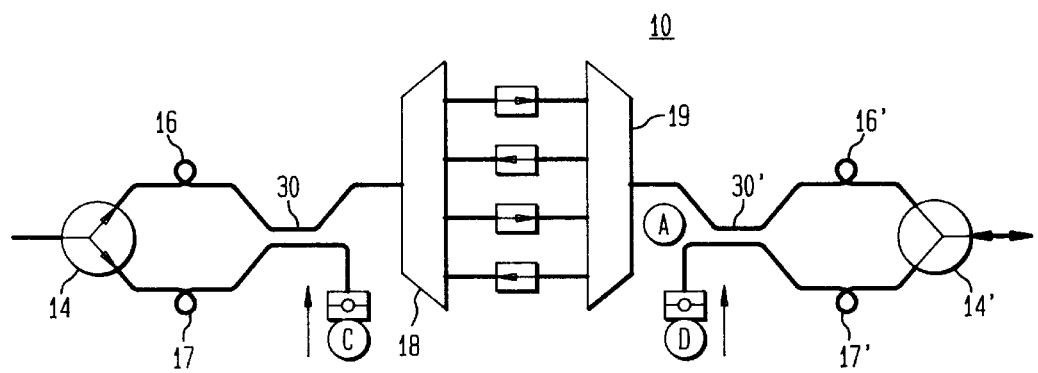
FIG. 3 is alternative embodiments using 3 dB couplers in lieu of one or more circulators.

FIG. 3 illustrates an alternative embodiment similar to that of FIG. 1 wherein 3 dB couplers 30, 30' are substituted for circulators 15, 15' in the amplifier sections. The fourth ports of one or more couplers can be used to launch power, as from pump resources C, D to pump the fiber amplifiers. The main advantage of this arrangement is a reduction in cost by reduction in the number of circulators.

Figure 4:
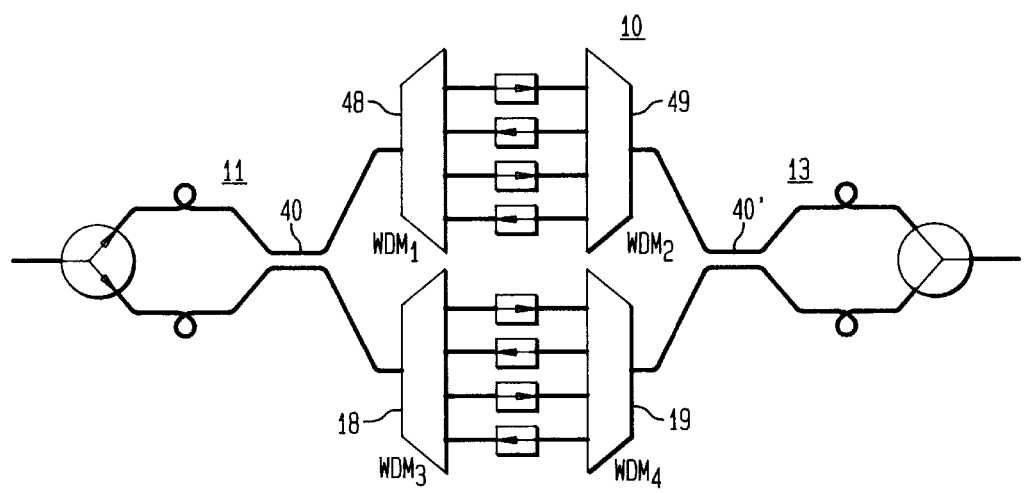
FIG. 4 is an alternative embodiment using plural pairs of WDMs.

FIG. 4 illustrates another alternative embodiment using a pair of 3 dB couplers 40, 40' and a MUX section comprising a plurality of pairs of WDMs. In this arrangement WDMs 18, 19 correspond to a specific band while WDMs 48, 49 correspond to a different band shifted wavelength. In this arrangement a larger number of channels can be accommodated for the same interstage loss. Alternatively, 2×2 mux-demuxers can be substituted for the 3 dB couplers 30, 30', and in more complex arrangements 4×4, 8×8 or nxn mux-demuxers could be used with 4, 8 and n pairs of WDMs.

Figure 5:
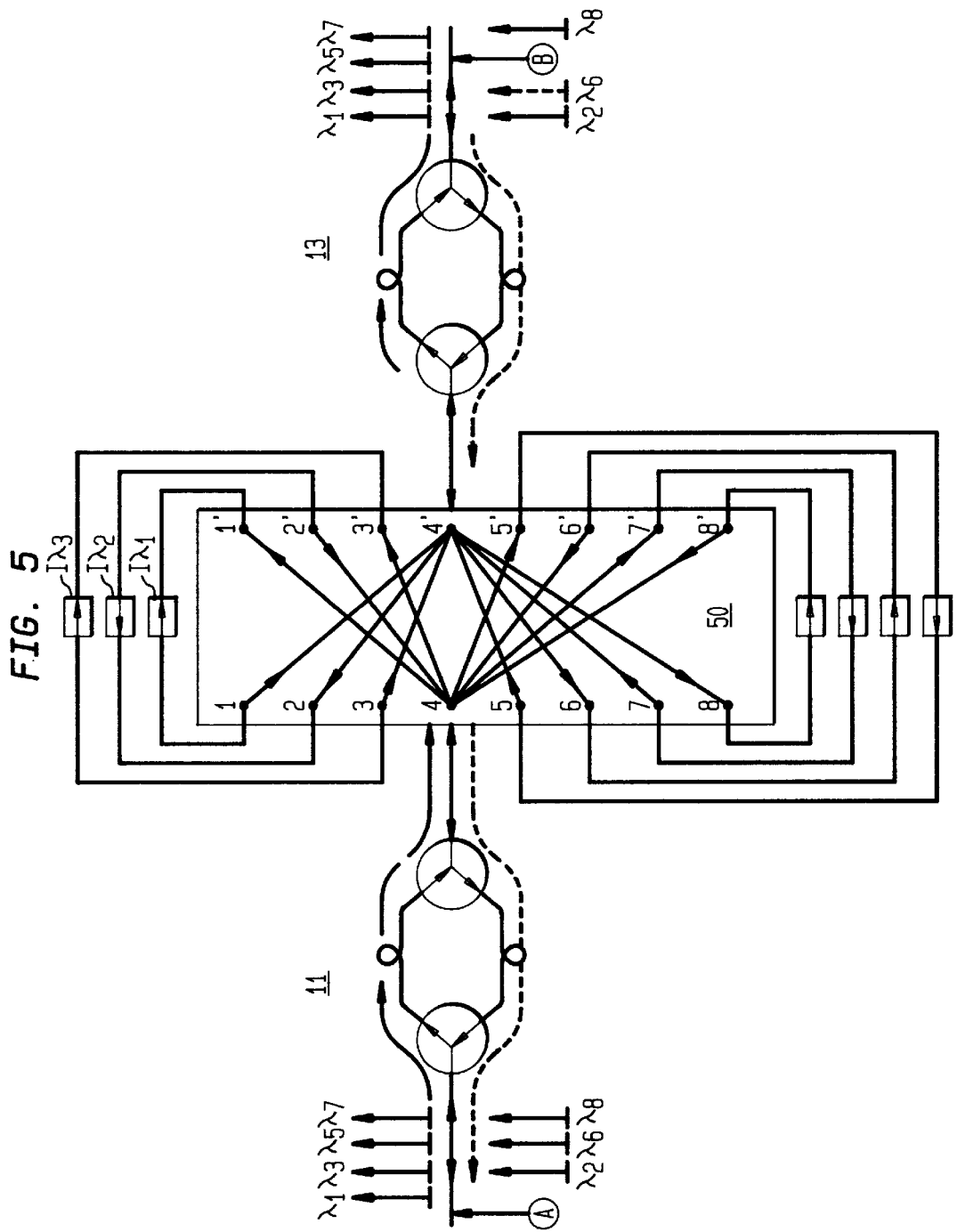
FIG. 5 is an alternative embodiment using an arrayed waveguide grating multiplexer.

FIG. 5 illustrates yet another alternative embodiment wherein an arrayed waveguide grating multiplexer 50 (here 8×8) replaces the pair of MUX-DEMUX devices. The channels are mux-demuxed to port number 4 after being routed through the isolators. The advantage of this design is compactness.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. An optical amplifier for amplifying two counter-propagating WDM optical signals in a bi-directional WDM optical communications system, each WDM signal comprised of plural optical signals of different wavelengths, said amplifier comprising:

first and second bi-directional amplifier sections for amplifying multiple wavelength component signals passing therethrough in either direction, each said amplifier section comprising at least one optical circulator having at least three ports, two ports of which are connected to a respective pair of amplifier arms; and disposed between said first and second amplifier sections a multiplexer section for separating signals from either one of said amplifiers into a plurality of wavelength components, passing them through unidirectional arms, and presenting the components in a recombined signal to the other of said amplifiers, whereby the effects of Rayleigh backscattering and amplified spontaneous emission are reduced.

2. The amplifier of claim 1 wherein at least one said unidirectional arm comprises an optical isolator.

3. The amplifier of claim 1 wherein at least one said uniderectional unidirection arm comprises a circulator.

4. The amplifier of claim 1 wherein at least one said bi-directional amplifier section comprises a pair of optical circulators each having at least three ports, said circulators connected via a pair of optical amplifier arms.

5. The amplifier of claim 1 wherein said multiplexer comprises a pair of WDMs interconnected via optical paths containing isolators.

6. The amplifier of claim 5 wherein at least one said isolator is switchable or latchable.

7. The amplifier of claim 1 wherein said multiplexer comprises a pair of WDMs interconnected via optical paths containing circulators.

8. The amplifier of claim 7 wherein at least one said circulator is switchable.

9. The amplifier of claim 1 wherein said multiplexer comprises an arrayed waveguide grating multiplexer.

10. The amplifier of claim 1 wherein at least one said bi-directional amplifier section comprises an optical circulator and a directional coupler.

* * * * *